United States Patent [19]

Kaufman

[11] 3,735,377
[45] May 22, 1973

[54] MONITORING AND SHUTDOWN APPARATUS

[75] Inventor: Carl Christopher Kaufman, Houston, Tex.

[73] Assignee: Phillips Petroleum Company, Bartlesville, Okla.

[22] Filed: Mar. 19, 1971

[21] Appl. No.: 126,045

[52] U.S. Cl. ....... 340/248 P, 317/33 SC, 317/36 TD, 328/129, 340/213 R, 340/419
[51] Int. Cl. ............................................. G08b 23/00
[58] Field of Search ...................... 340/248 P, 253 P, 340/223; 324/161, 181; 317/33 R, 33 SC, 36 TD; 328/129

[56] References Cited

UNITED STATES PATENTS

| | | | |
|---|---|---|---|
| 2,985,828 | 5/1961 | Mason | 328/129 X |
| 2,996,630 | 8/1961 | Bensema et al. | 340/248 P X |
| 2,563,879 | 8/1951 | Soukaras | 324/188 |
| 2,589,465 | 3/1952 | Weiner | 340/248 P |
| 2,857,587 | 10/1958 | Tollefson et al. | 340/248 P |
| 2,984,789 | 5/1961 | O'Brien | 340/248 P |

*Primary Examiner*—David L. Trafton
*Attorney*—Young and Quigg

[57] ABSTRACT

A shutdown and/or alarm system is actuated by a monitor. The system includes an AND circuit which comprises a switch and two multivibrators. The multivibrators have different reset times. A signal from the monitor closes the switch for a given time interval, and triggers and initiates resetting of the multivibrators at the end of this interval. Signals from the multivibrators are passed through the switch to energize a shutdown device and/or an alarm.

6 Claims, 1 Drawing Figure

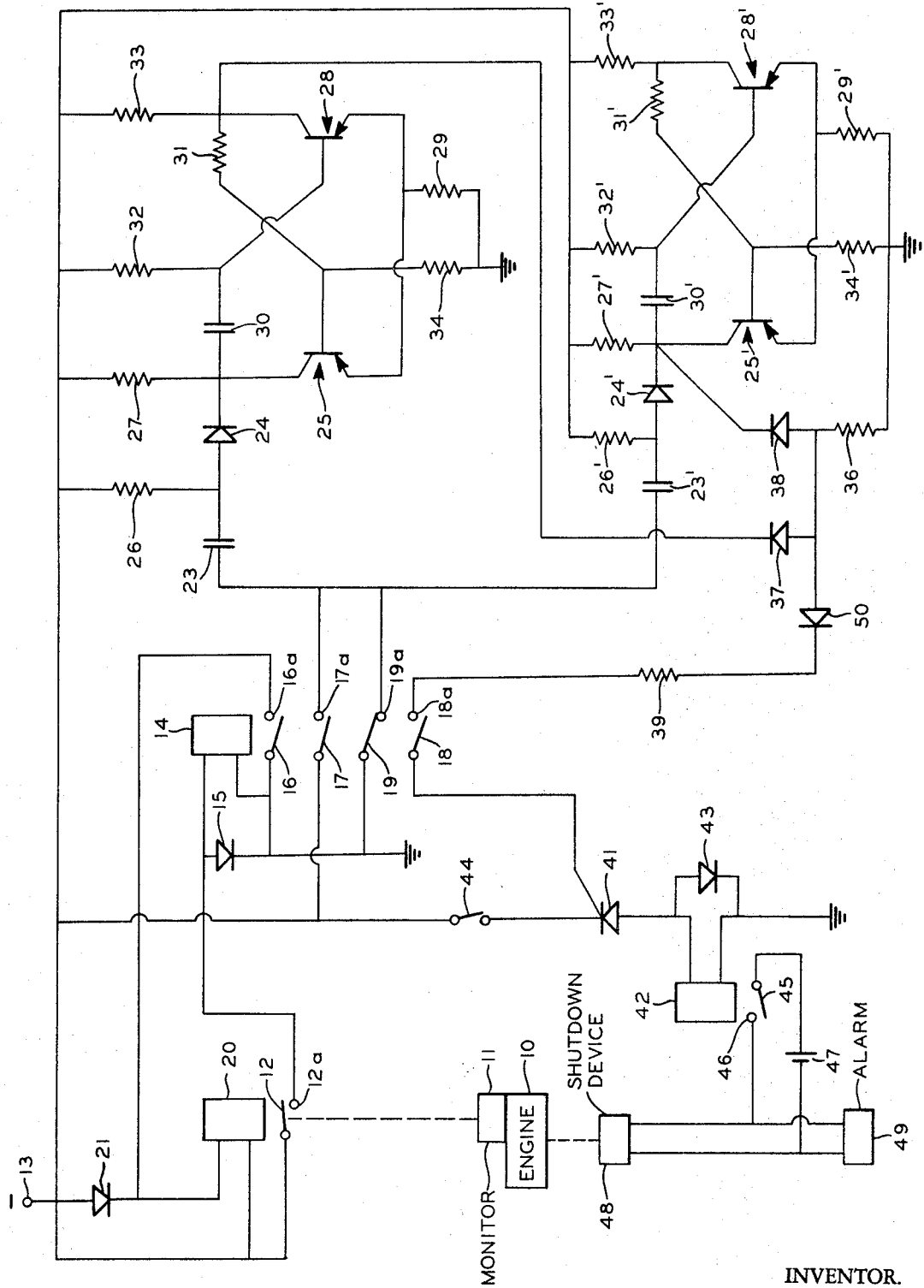

MONITORING AND SHUTDOWN APPARATUS

Safety devices of various types are frequently employed to monitor the operations of machines and processes. These safety devices measure an operating variable and provide an alarm or shutdown signal whenever the variable exceeds certain limits. For example, it is common practice to attach vibration sensing elements to machines to shut down the machines if excessive vibrations are detected. Flow monitors are used to detect the flow of lubricating oil to engines and compressors. Still another example of a safety device involves the use of temperature sensing elements to detect excessively high temperatures in various systems.

A problem is frequently encountered in the use of safety monitors if the monitor is constructed so that a single output signal above a threshold level results in automatically shutting down the apparatus being monitored. While this may be the ultimate purpose of the monitoring device, it is often not necessary to take such drastic action if the output signal exceeds the threshold level only momentarily. For example, the backfiring of an engine on startup may result in temporary excess vibration. However, this is not a permanent situation and does not require the engine to be shut down. In view of the fact that the shutting down of large compressors, pumps and engines can be an expensive operation and may cause serious operating problems in a plant, it is desirable to prevent the shutdown mechanism from being actuated each time a single "failure" signal is established.

A solution to this problem is provided in accordance with the present invention. The control apparatus attached to the monitor comprises an AND circuit which includes two rectifiers and a switch. All three must be in a "true" condition to cause the shutdown mechanism to be actuated. The two rectifiers are controlled by respective one-shot multivibrator circuits which are reset by respective delay circuits that have delays of different time intervals. It is necessary that two failure signals be detected within a predetermined time interval in order for the shutdown mechanism to be actuated.

The accompanying drawing is a schematic circuit illustration of an embodiment of the apparatus of this invention.

Referring now to the drawing in detail, there is shown an engine 10 which is provided with a monitoring device 11. Engine 10 can represent a pump, compressor, or any other type of machine, the operation of which is to be controlled. Monitor 11 establishes an output signal when a measured variable exceeds predetermined limits. This monitor can be a vibration detector, a flow detector to measure the flow of lubricating oil in the engine, or a temperature sensing device, for example. The output signal from monitor 11 moves a switch 12 into engagement with a contact 12a whenever the detected variable exceeds a preset value.

Switch 12 is connected to terminal 13 which supplies a negative operating potential. Terminal 12a is connected to a first terminal of a relay coil 14, the second terminal of which is connected to ground. A rectifier 15 is connected in parallel with relay coil 14. When relay coil 14 is energized, switches 16, 17 and 18 move into engagement with respective terminals 16a, 17a and 18a, and switch 19 moves out of engagement with terminal 19a. Terminal 16a is connected to one terminal of a relay coil 20, the second terminal of which is connected to terminal 13. A rectifier 21 is connected in parallel with relay coil 20. When relay coil 20 is energized, switch 12 is moved out of engagement with terminal 12a. This serves to reset switch 12.

Terminals 17a and 19a are connected to the first terminal of a capacitor 23. A rectifier 24 is connected between the second terminal of capacitor 23 and the collector of a transistor 25. A resistor 26 is connected between terminal 13 and the junction between capacitor 23 and rectifier 24. A resistor 27 is connected between terminal 13 and the collector of transistor 25. The emitter of transistor 25 is connected to the emitter of a transistor 28, and these two emitters are connected by a resistor 29 to ground. A capacitor 30 is connected between the collector of transistor 25 and the base of transistor 28. A resistor 31 is connected between the collector of transistor 28 and the base of transistor 25. A resistor 32 is connected between terminal 13 and the base of transistor 28, and a resistor 33 is connected between terminal 13 and the collector of transistor 28. A resistor 34 is connected between the base of transistor 25 and ground. Transistors 25 and 28 and the circuit elements associated therewith constitute a one-shot multivibrator.

Terminals 17a and 19a are also connected to a second one-shot multivibrator circuit which is substantially identical to the one previously described and wherein the corresponding elements are designated by like primed reference numerals. The only difference between the two circuits is that capacitor 30' has a greater capacitance than does capacitor 30.

A resistor 36 and a rectifier 37 are connected in series relationship between ground and the collector of transistor 28. A rectifier 38 is connected between resistor 36 and the collector of transistor 25'. A resistor 39 and a rectifier 50 are connected between resistor 36 and terminal 18a. Switch 18 is connected to the control electrode of a silicon-controlled rectifier 41. A relay coil 42, which has a rectifier 43 connected in parallel therewith, is connected between ground and the anode of rectifier 41. The cathode of rectifier 41 is connected by a normally closed reset switch 44 to terminal 13. Relay coil 42 moves a switch 45 into engagement with a terminal 46 when energized. This connects a current source 47 to a shutdown device 48 and to an alarm 49. Shutdown device 48 operates to shut down engine 10.

In the absence of an output signal from monitor 11, switch 12 remains open and relay coils 14 and 42 are deenergized. At this time transistors 28 and 28' are conducting and transistors 25 and 25' are non-conducting, which places rectifier 38 in a conducting state and rectifier 37 in a non-conducting state. An output pulse from monitor 11 serves to close switch 12 to energize relay coil 14. This closes switch 17 and opens switch 19 to discharge capacitors 23 and 23'. Relay coil 20 is energized at this time to reset switch 12 which simultaneously de-energizes coil 14 so that switches 16, 17, 18 and 19 are returned to their initial positions. This starts the charging of capacitors 23 and 23' and applies pulses through rectifiers 24 and 24' to trigger the respective multivibrator circuits so that transistors 25 and 25' become conducting and transistors 28 and 28' become non-conducting. Rectifier 37 conducts at this time, and rectifier 38 becomes non-conducting. As previously mentioned, capacitor 30' is larger than capacitor 30. The values of the capacitors are selected so that the time required to charge capacitor 30' is approximately twice the time required to charge capacitor 30. These respective times can be 8 and 4 seconds, for example, or any combination determined by the application. At the ends of the respective charging times, the multivibrators are reset to their initial states.

Switch 18 and rectifiers 37 and 38 constitute an AND logic circuit. Rectifier 41 is fired only when switch 18 is closed and rectifiers 37 and 38 are both non-conducting. During the time only after capacitor 30 has charged and before capacitor 30' has charged, transistors 28 and 25' are both conducting and rectifiers 37 and 38 are both non-conducting. If a second signal should be generated by monitor 11 during this interval, switch 18 is closed when relay coil 14 is energized. This results in the AND circuit becoming "true" because a ground potential is applied to the control electrode of rectifier 41 to fire the rectifier. This energizes relay coil 42 to close switch 45 and actuate shutdown device 48 and alarm 49. The circuit can be reset by opening switch 44.

In one specific embodiment of this invention, resistors 26, 26', 32, 36 and 39 were 10,000 ohms each. Resistors 27, 27', 33 and 33' were 270 ohms each. Resistors 32 and 31' were 10,000 ohms each. Resistors 34 and 34' were 4,700 ohms each, and resistors 29 and 29' were 47 ohms each. Resistor 32' was 15,000 ohms. Capacitors 23 and 23' were 0.04 microfarad each. Capacitor 30 was 250 microfarads, and capacitor 30' was 390 microfarads. Terminal 13 was maintained at −12 volts. With these values, the charging time of capacitor 30 is approximately 4 seconds, and the charging time of capacitor 30' is approximately 8 seconds. Thus, the shutdown circuit is not actuated for at least 4 seconds after monitor 11 establishes an output signal, and only then if a second output signal is received during the following 4 seconds. Of course, these times can be adjusted by using circuit components having different values.

While this invention has been described in conjunction with a presently preferred embodiment, it obviously is not limited thereto.

What is claimed is:

1. Control apparatus adapted to be used in monitoring systems in which a monitor establishes a first signal whenever a measured variable exceeds a preselected limit, said apparatus comprising:

first means having three inputs and an output to establish a first output control signal when three input signals representative of preselected conditions are applied to said respective three inputs, said first means including a silicon-controlled rectifier;

second means responsive to said first signal to apply a signal representative of one of said conditions to the first of said three inputs for a first time interval each time a first signal is established by the monitor, said second means includes a switch connected to the control electrode of said rectifier;

third means responsive to said first signal to apply a signal representative of a second of said conditions to the second of said three inputs for a second time interval following each first time interval; and fourth means responsive to said first signal to apply a signal representative of the third of said conditions to the third of said three inputs for a third time interval following each first time interval, said third time interval being longer than said second time interval, said third and fourth means establishing potentials which are applied through said switch to said control electrode when said switch is closed.

2. The apparatus of claim 1 wherein said third and fourth means include first and second one-shot multivibrators, respectively, having different time constants.

3. Control apparatus adapted to be used in monitoring systems in which a monitor establishes a first signal whenever a measured variable exceeds a preselected limit, said apparatus comprising:

a first switch adapted to be closed by said first signal;

a first relay coil to open said first switch when energized;

a second relay coil;

first circuit means to energize said second relay coil when said first switch is closed;

second circuit means responsive to said second relay coil being energized to energize said first relay coil;

third circuit means to establish an output control signal when energized, said third circuit means having a control element therein which energizes said third circuit means when a potential of preselected magnitude is applied to said control element;

first and second one-shot multivibrators having different reset time constants, the reset time of the second being longer than the reset time of the first;

fourth circuit means connected to said first multivibrator to establish a potential of preselected magnitude when said first multivibrator is in a reset condition;

fifth circuit means connected to said second multivibrator to establish a potential of preselected magnitude when said second multivibrator has been triggered but before being reset;

sixth circuit means responsive to said second relay coil being energized to trigger and thereafter initiate the resetting of said first and second multivibrators; and means responsive to said second relay coil being energized to apply the potentials established by said fourth and fifth circuit means to said control element for a time interval which is of shorter duration than the reset time of the first multivibrator.

4. The apparatus of claim 3 wherein said fourth circuit means comprises a first rectifier connected between a source of reference potential and said first multivibrator so that said first rectifier is non-conductive when said first multivibrator is in a reset state and is conductive when said first multivibrator is triggered, and said fifth circuit means comprises a second rectifier connected between said source of reference potential and said second multivibrator so that said second rectifier is conductive when said second multivibrator is in a reset state and is non-conductive when said second multivibrator is triggered.

5. The apparatus of claim 3 wherein each of said multivibrators has a capacitor and a rectifier connected to the input thereof so that the respective capacitors are discharged when said second relay is energized and are charged when said second relay is deenergized, whereby triggering pulses are applied from said capacitors through the respective rectifiers when the capacitors are charged.

6. The apparatus of claim 3 wherein said third circuit means includes a silicon-controlled rectifier having a control electrode which comprises said control element.

* * * * *